C. HAMBUECHEN.
DRY CELL AND ITS METHOD OF MANUFACTURE.
APPLICATION FILED APR. 27, 1916.

1,292,764.

Patented Jan. 28, 1919.

Inventor
Carl Hambuechen
By his Attorneys
Pennie Davis + Marvin

UNITED STATES PATENT OFFICE.

CARL HAMBUECHEN, OF BELLEVILLE, ILLINOIS, ASSIGNOR, BY MESNE ASSIGNMENTS, TO BURGESS BATTERY COMPANY, OF MADISON, WISCONSIN, A CORPORATION OF WISCONSIN.

DRY CELL AND ITS METHOD OF MANUFACTURE.

1,292,764. Specification of Letters Patent. Patented Jan. 28, 1919.

Application filed April 27, 1916. Serial No. 93,843.

*To all whom it may concern:*

Be it known that I, CARL HAMBUECHEN, a citizen of the United States, residing at Belleville, county of St. Clair, State of Illinois, have invented certain new and useful Improvements in Dry Cells and Their Method of Manufacture; and I do hereby declare the following to be a full, clear, and exact description of the invention, such as will enable others skilled in the art to which it appertains to make and use the same.

The present invention relates to primary cells or batteries of the Le Clanche type commonly known as dry cells and more particularly to that species in which a gelatinized electrolyte is used.

The objects of the present invention are to simplify the procedure of assembling the component parts, to permit the use of stronger or richer electrolytes, to dispense with the use of a bibulous envelop as an inclosure for the depolarizing mix, to increase the output of the battery, to decrease its internal resistance, to prevent entrapment of air, and to secure other advantages in the process and in the product as will be made clear by the detailed description which follows:

In the accompanying drawing forming a part of this specification,—

Figure 1:
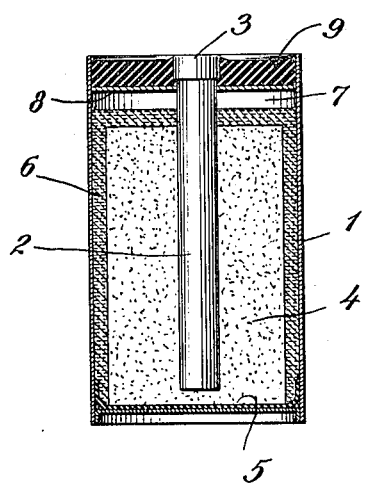
Figure 2:
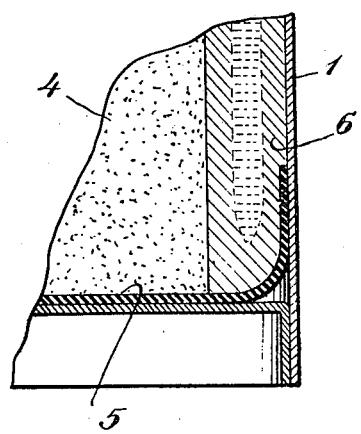

Figure 1 is a sectional elevation of a dry cell constructed in accordance with the present invention; and Fig. 2 represents diagrammatically the electrolyte while undergoing gelatinization.

In the embodiment illustrated in the drawing, the zinc electrode 1 is of usual construction and formed in the shape of a container for the other elements of the cell. There is provided the usual carbon rod 2 having a brass contact cap 3, this rod being enveloped in a mass of depolarizing material 4 which may consist of manganese dioxid such as pyrolusite, recovered manganese, or the like, intimately mixed with a carbonaceous material such as graphite, retort carbon, or a mixture of these. Such a mixture when dampened with water or with an aqueous solution of zinc chlorid and ammonium chlorid or their equivalents may be molded into shape about the carbon rod 2 in a suitable tamping machine, and when thus compressed into the form of a cylindrical block has sufficient coherence to permit handling in the factory, and though the complete electrode thus formed cannot be regarded as either rugged or physically permanent, it can, with care, be lifted by its carbon rod 2 and be transported or manipulated so far as factory needs require. In the assembling of the cell, a paper disk 5 either of tar paper or of paraffin paper is forced down into the zinc contained to cover its bottom and preferably to overlap the sides of the container just above the bottom seam. This paper disk serves as a spacer and has other functions which will be understood by those skilled in the art. In the assembly of the cell, the negative electrode consisting of the carbon rod 2 and its fragile envelop of depolarizing mix but without the usual wrapping of bibulous material such as cheese-cloth, or the like, is gently lowered into the zinc container until it rests on the paper spacer 5. Then the gelatinizable electrolyte 6 is poured in to about the relative level indicated in the drawing, and as hereinafter described, is then allowed to set or gelatinize. A gas space 7 is left above the top of the electrolyte and over this is placed a paraffin paper washer 8 above which the pitch or other sealing compound 9 is poured in to a level approximately flush with the top of the zinc container and the brass cap 3. It is to the electrolyte 6, and to the advantages attendant upon its use, that my present invention is particularly directed. Although this electrolyte may vary somewhat in composition, I prefer to use the materials hereinafter specified and to compound them in approximately the relations mentioned. There is first made up an aqueous solution of zinc chlorid having a density of about 35° Baumé. This is approximately a 32% solution. In this solution I dissolve sal ammoniac in the proportions of 450 grams to each 1000 c. c. of chlorid electrolyte solution. Such a solution can be made up in any quantity and will keep indefinitely. In accordance with my present process, I put the solution in an ice box and refrigerate it below 16° C. and preferably lower than that. It is to this refrigerating operation that much of the success in the process is to be attributed. As a medium for gelatinizing this chlorid electrolyte solution, I use a cereal and the one which I have found most useful is a mixture of two parts of cornstarch and one of corn meal. Other starches and meals can also be used, such as rice flour, potato starch, or the like. As a precaution, I prefer to keep the cereals also in an icebox, though in some instances, this may not be necessary. Also, as a regular practice, particularly in warm weather, I keep the vessels in which the chlorid electrolyte solution and cereal are to be mixed, as well as the implement to be used in mixing, in ice water during the intervals of time between the mixing up of successive batches of the gelatinizable material.

To compound the gelatinizable mixture I take the chlorid electrolyte solution and the cereal and the implements from the ice-box at a temperature not much above 0° C. and then I quickly mix the materials together in approximately the proportions of 80 c. c. of the chlorid electrolyte solution and 35 grams of the dry cereal. The illustrative proportions given above result in a mixture whereof by weight about 36.7% is mixed chlorids and about 25.5% by weight is cereal, and although, as above stated, this electrolyte may vary somewhat in composition, it should be rich enough in zinc chlorid to set in a few minutes at room temperature, and the mixture of chlorids and cereals should be so proportioned that the electrolyte will promptly gelatinize and will remain gelatinized at room temperature. The mixture is thoroughly stirred, after which it is at once poured into the cells prepared for its reception. The mixture so compounded cannot well be stored and should be prepared only in small batches just previous to use. Just prior to pouring the electrolyte into the cell, the operator takes hold of cap 3 and centers the electrode within the zinc container while it rests on the paper spacer 5, and then the electrolyte, while still cold, say below 16° C., is poured in to fill the space between the two electrodes up to a level somewhat above the top of the molded mix. As there is no cheese cloth wrapping or other bibulous envelop for the depolarizing mix, there is little chance for air to become entrapped and there is every opportunity for the electrolyte to come into intimate contact with both the zinc container and the depolarizing cylinder. The electrolyte thus poured in, being much colder than either the zinc container or the depolarizing cylinder, (these being at room temperature, say 28° C.) takes up heat from both and immediately begins to gelatinize and, furthermore, this gelatinization proceeds not only inward from the zinc surface, but also outward from the surface of the mix, as indicated diagrammatically in Fig. 2. There is a particular advantage in this, for the cylinder of depolarizing mix is so lightly coherent that it would physically disintegrate quickly if washed with water or with an aqueous solution, and any washing away of the mix would be disastrous to the cell for the dislodged material would come into contact with the zinc surface and set up local action which would result in destructive pitting.

With my invention, it might be said that the refrigerated electrolyte begins to gelatinize the instant it strikes the much warmer zinc and battery mix, and this gelatinization proceeds so quickly that the operator can be permitted to hold his finger on the brass cap and thereby hold the core in central position within the container until the electrolyte has stiffened sufficiently to prevent dislodgment of the electrode or its accidental contact with the zinc container. The electrolytic mass sets to a consistency of a stiff jelly in about 2 to 5 minutes. There is no need for warming up the cell after pouring in the mixture, as by setting it into hot water, or other troublesome procedure.

Owing to the use of refrigeration as above explained, I am able to employ a stronger solution of zinc chlorid and ammonium chlorid than would otherwise be the case, for if the strong solution herein described were mixed with cereals at room temperature, the mixture would gelatinize so quickly that it could not be handled in a practical manner. This increase in the strength of the electrolyte gives higher conductivity, greater resistance to local action because of the greater zinc content and better electrical output for the cell. The absence of a cheese-cloth wrapping or other bibulous envelop for the depolarizing mix permits full contact between the depolarizing mass and the electrolyte and this gives to the batteries properties superior to those of cells made with a wrapped core. There is no inert material in the path of the current and no air bubbles entrapped in the meshes of a wrapping where they would take up space which should be occupied by active electrolyte. Also, I am able to get more depolarizing material into a cell of given volume as the space which would be occupied by bibulous material, especially at the top and the bottom of the core, can be filled with additional depolarized mass without taking the place of any necessary electrolyte.

Various changes may be made in the mechanical construction of the cell and in the chemical composition of its several elements without departing from the principles of my present invention as defined by the claims appended hereto, and the cells may be made in novelty sizes or in the larger and more common sizes used for telephone and ignition work.

I claim:

1. The method of assembling a dry cell which consists in compounding a refrigerated mixture of electrolyte and cereal, introducing said mixture while cold into the space between the electrodes of the cell and allowing it to gelatinize therein as the mixture rises to room temperature.

2. The method of assembling a dry cell which consists in preparing a refrigerated cold mixture of chlorid solution and cereal, introducing said mixture while cold into the space between the electrodes of the cell and allowing it to gelatinize therein at room temperature.

3. The method of assembling a dry cell which consists in preparing a refrigerated solution of zinc and ammonium chlorids, mixing a cereal therewith, introducing said mixture while still cold between the electrodes of the cell and allowing it to gelatinize therein at room temperature.

4. The method which consists in refrigerating an electrolytic solution compounded in about the proportions of 450 grams of sal ammoniac to 1000 c. c. of zinc chlorid solution having a density of about 35° Bé., adding a cereal to said solution and pouring the resultant mixture while still cold into the space between the electrodes of a dry cell to form an electrolyte therebetween, and then allowing said mixture to gelatinize between said electrodes as said mixture rises to room temperature.

5. The method which consists in making an electrolytic solution by dissolving about 450 grams of sal ammoniac in 1000 c. c. of zinc chlorid solution, the latter having a strength of about 35° Bé., refrigerating said electrolytic solution below 16° C., adding thereto cold cereal consisting of about two parts cornstarch to one of corn meal, pouring the mixture so compounded into the space between the electrodes of a dry cell and there allowing it to gelatinize as the mixture rises to room temperature.

6. As a step in the production of a dry cell, refrigerating materials for a gelatinizable electrolyte, compounding the electrolyte, and while still cold pouring it between the electrodes of the cell and then allowing it to there gelatinize as the mixture rises to room temperature, substantially as described.

7. A dry cell having a gelatinous electrolyte containing about 450 grams of sal ammoniac to each 1000 c. c. of 32% zinc chlorid solution, substantially as described.

8. A dry cell having a gelatinous electrolyte containing cereal and about 450 grs. of salammoniac to each 1000 c. c. of 32% zinc chlorid solution.

9. A dry cell having a gelatinous electrolyte comprising about 36.7% chlorid and about 25.5% cereal by weights so that the electrolyte will promptly gelatinize and will remain gelatinized at room temperature.

10. An electrolyte for dry cells, comprising a mixture of chlorids in the proportion of about 36.7% mixed chlorids by weight and cereal in about the proportion of 25.5% by weight, so that the electrolyte will set in a few minutes at room temperature, substantially as described.

11. The method of making a dry cell without cooking, which consists in assembling about a carbon rod a compressed and coherent but fragile mass of manganese depolarizer and carbonaceous material, introducing the complete and naked electrode so prepared into a zinc electrode and then pouring a refrigerated, gelatinizable electrolyte into the space between said electrodes to contact directly with both and to serve as their only separating medium, said electrolyte being of a character to gelatinize without being heated above room temperature.

12. The method of making dry cells, which consists in compressing about a carbon rod a mixture of manganese dioxid and carbonaceous material to form an electrode, introducing the electrode so prepared into a zinc cup, and then pouring into the space between said electrode and said cup to contact directly with both, a gelatinizable electrolyte containing zinc and ammonium chlorids and cereal.

In testimony whereof I affix my signature.

CARL HAMBUECHEN.

It is hereby certified that in Letters Patent No. 1,292,764, granted January 28, 1919, upon the application of Carl Hambuechen, of Belleville, Illinois, for an improvement in "Dry Cells and Their Method of Manufacture," errors appear in the printed specification requiring correction as follows: Page 2, line 118, for the word "depolarized" read *depolarizing;* page 3, line 8, claim 2, for the words "preparing a refrigerated" read *compounding a relatively;* and that the said Letters Patent should be read with these corrections therein that the same may conform to the record of the case in the Patent Office.

Signed and sealed this 4th day of March, A. D., 1919.

[SEAL.]

R. F. WHITEHEAD,
*Acting Commissioner of Patents.*

Cl. 204—29.